(12) United States Patent
Hopewell et al.

(10) Patent No.: US 7,035,852 B2
(45) Date of Patent: Apr. 25, 2006

(54) IMPLEMENTING A MESSAGE QUEUING INTERFACE (MQI) INDEXED QUEUE SUPPORT THAT ADDS A KEY TO THE INDEX ON PUT COMMIT

(75) Inventors: Paul Hopewell, Chandlers Ford (GB); Paul Kettley, Winchester (GB); Jeffrey M. Nick, West Park, NY (US); Peter Siddall, Romsey (GB); James H. Warnes, Hopewell JCT, NY (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 09/909,538

(22) Filed: Jul. 20, 2001

(65) Prior Publication Data

US 2002/0087507 A1    Jul. 4, 2002

Related U.S. Application Data

(60) Provisional application No. 60/219,889, filed on Jul. 21, 2000.

(51) Int. Cl.
*G06F 17/30*    (2006.01)
(52) U.S. Cl. .......................................... 707/8
(58) Field of Classification Search ............... 707/1, 707/8, 2
See application file for complete search history.

(56) References Cited

U.S. PATENT DOCUMENTS

| 5,696,910 | A | * | 12/1997 | Pawlowski | 710/100 |
| 5,857,180 | A | * | 1/1999 | Hallmark et al. | 707/2 |
| 5,999,964 | A | * | 12/1999 | Murakata et al. | 709/201 |
| 6,058,389 | A | * | 5/2000 | Chandra et al. | 707/1 |

* cited by examiner

*Primary Examiner*—Jack M. Choules
(74) *Attorney, Agent, or Firm*—George E Grosser; John D. Flynn

(57) ABSTRACT

Provided are a method, computer program product and system for providing indexed queue support for efficient retrieval of messages from a queue. An index key for expediting message retrieval is assigned to a message when the operation of placing the message on a queue is committed. The index key assigned at commit time comprises an attribute (such as a message ID or correlation ID) specified by the sending application program, which placed the message on the queue. This deferred assignment of an index key until commit time means that the index key can be used to search for messages having the particular attribute without any possibility of identifying messages for retrieval before the messages have been committed. This maintains transactional requirements of a transaction-oriented messaging system which requires a message to only be made available for retrieval by receiver application programs after the sender application's put operation has committed.

14 Claims, 4 Drawing Sheets

IMPLEMENTING A MESSAGE QUEUING INTERFACE (MQI) INDEXED QUEUE SUPPORT THAT ADDS A KEY TO THE INDEX ON PUT COMMIT

CROSS REFERENCES TO RELATED PATENT APPLICATIONS

This application claims priority and all other benefits under 35 U.S.C 120 of prior filed co-pending US provisional patent application U.S. Ser. No. 60/219,889, filed Jul. 21, 2000, which is incorporated herein by reference.

This application is related to the subject matter of the following co-pending patent applications, each of which is assigned to the same assignee as this application and each of which is incorporated herein by reference:

D. A. Elko et al., now U.S. Pat. No. 6,963,882 filed Oct. 2, 2000, entitled "METHOD AND APPARATUS FOR PROCESSING A LIST STRUCTURE"now U.S. Pat. No. 6,963,882;

D. A. Elko et al, now U.S. Pat. No. 6,862,595, filed Oct. 2, 2000, entitled "METHOD AND APPARATUS FOR IMPLEMENTING A SHARED MESSAGE QUEUE USING A LIST STRUCTURE"now U.S. Pat. No. 6,862,595, ;

P. Kettley et al., U.S. Ser. No. 09/605,589, filed Jun. 28, 2000, entitled "METHOD AND APPARATUS FOR OPERATING A COMPUTER SYSTEM TO ENABLE A RESTART";

P. Kettley et al., U.S. Ser. No. 60/220,685, filed Jul. 25, 2000, entitled "METHOD AND APPARATUS FOR IMPROVING MESSAGE AVAILABILITY IN A SUBSYSTEM WHICH SUPPORTS SHARED MESSAGE QUEUES"now U.S. Pat. No. 6,842,763.

FIELD OF INVENTION

The present invention relates, in general, to messaging within a distributed data processing environment and, in particular, to use of indexing for improved message retrieval in such an environment.

BACKGROUND

Asynchronous transfer of messages between application programs running on different data processing systems within a network is well known in the art, and is implemented by a number of commercially available message-oriented middleware products. These products include IBM Corporation's MQSeries family of messaging products, which use asynchronous messaging via queues. A sender application program issues a PutMessage command to send a message to a target queue, and MQSeries queue manager programs handle the complexities of transferring the message under transactional control from the sender to the target queue, which may be remotely located across a heterogeneous computer network. The MQSeries queue manager programs implement transactional assured message delivery even when the destination application is not available at the time the message was sent. The target queue is a local input queue for another application program, which retrieves the message from this input queue by issuing a GetMessage command asynchronously from the send operation. The receiver application program then performs its processing on the message, and may generate further messages. MQSeries and IBM are trademarks of International Business Machines Corporation.

IBM Corporation's MQSeries products and messaging and queuing are described in "MQSeries—An Introduction to Messaging and Queuing" which is available from IBM as and by B. Blakeley, H. Harris and J. R. T Lewis in "Messaging and Queuing using the MQI: Concepts and Analysis, Design and Development", 1995, McGraw-Hill.

A feature of the Message Queuing Interface (MQI) implemented by IBM's MQSeries products is the ability to handle GetMessage requests with a wait option. If the "Get_wait" option is specified by an application and no message is currently available which satisfies a specified criteria, the application will wait to be notified when a message which satisfies the criteria subsequently arrives on the queue.

One known implementation of this feature is to use indexed queues, where indices are maintained to expedite GetMessage operations on the queue. Example index types are:

NONE—No index is maintained

MSGID—An index of message identifiers is maintained. This is used when messages are usually retrieved by message identifier as a selection criteria on the GetMessage call CORRELID—An index of correlation identifiers is maintained. This is used when messages are usually retrieved by correlation identifier as a selection criteria on the GetMessage call.

An application putting a message to a queue optionally assigns values to the message identifier and correlation identifier. These key values combined with the index type of the queue dictate which, if any, index entries are built for the message. In a single queue manager environment, the index entries live in the single owning queue manager and the time taken to perform message retrieval in response to a GetMessage request can be decreased by the GetMessage utilising the index associated with the queue. An application issuing a GetMessage request for a message with a specific message identifier or correlation identifier can optionally request to wait until a message which satisfies the criteria arrives on the queue. In a single queue manager environment, the queue manager can easily determine when a message is Put that satisfies an application which issued "Get_wait".

However, some resource manager products including IBM's MQSeries message queue manager products implement clustering for increased message throughput and availability. This clustering can involve a number of queue manager programs managing retrieval of messages from a shared queue, as well as putting messages to shared queues. In an example messaging solution for a data processing system running IBM Corporation's OS/390 operating system, the shared queues may be stored in OS/390 Coupling Facility list structures. The Coupling Facility may be located on a dedicated system to provide highly available, shared storage which is accessible by one or more programs coupled to the Coupling Facility and performs operations requested by those coupled programs. Data and controls to be shared between the coupled programs are stored in storage structures of the Coupling Facility. These storage structures can include cache, list and lock structures. Aspects of the operation of a Coupling Facility are described in detail in U.S. Pat. Nos. 5,317,739, 5,561,809 and 5,706,432. (OS/390 is a trademark of International Business Machines Corporation).

In a shared queue environment, a number of problems have to be addressed to implement the wait option for GetMessage requests, including how to notify applications which are running on different systems from the shared queue of the arrival of a message on that queue.

A further problem is how to avoid messages being retrieved from a queue before the message Put operation has been committed. A known solution to this problem is to apply locks to each message while the message Put operation is in-doubt, and to only release the lock and make the message available for retrieval by other applications after the Put operation has been committed. In a shared queue environment, managing the application and removal of these locks in response to requests from remote processes is a significant overhead. In particular, if GetMessage requests specify index information such as a message identifier (message ID) or correlation identifier (correlation ID), commit duration locks cannot be applied to the message ID or correlation ID because this would lock committed as well as uncommitted messages which have the same index and a solution which monitors the availability of messages with reference to an index only to discover that the messages are locked would be inefficient.

The use of shared queues in a multi-processor environment is also known from U.S. Pat. No. 5,887,168, for example.

This discloses enqueuing a received message onto a shared queue and then any one of a plurality of systems which has available capacity can retrieve and process the message.

Where appropriate, responses are enqueued onto the shared queue for delivery back to the original sender. A list structure comprised of a plurality of sub-lists is used to implement the queue.

SUMMARY OF INVENTION

In a first aspect of the present invention, there is provided a method of managing retrieval of messages from a queue, each message on the queue having been sent by a sender application program, the method comprising: assigning an index key to a message in response to commit of the operation of putting the message on the queue, wherein the assigned index key comprises an attribute value of the message which was specified by the sending application when the message was sent (if the attribute was specified); and in response to a receiver application program requesting retrieval of messages from the queue and specifying the attribute value, monitoring the availability of messages in the queue with reference to said assigned index key, whereby the index key assigned to the message in response to said commit provides an index which is usable for identifying committed messages having the particular application-specified attribute value.

In response to the monitoring step identifying the availability of a committed message in the queue which has the assigned index key, the message is checked to determine whether it matches other criteria of the retrieval request. If it matches, a response is sent to the application program which issued the request. This response preferably includes the message which matches the request.

The use of index keys to expedite message retrieval operations, while deferring assignment of an index key until commit of the operation of putting the message on the queue, enables efficient processing of message retrieval requests without the potential conflicts that would arise if the index keys for use in a search were assigned when the message was placed on the queue (i.e. If assigned at message Put time, the index key would suggest availability of a message but attempts to retrieve it would need to be refused until the Put operation is committed, to ensure transactional consistency).

The invention provides advantages over merely setting a commit flag on a message, since the index key which is assigned at commit time is itself a searchable index comprising a message attribute specified by the sender application (such as a message ID or correlation ID). This is significant because application programs frequently need to be able to retrieve only a specific subset of the messages that may be in the queue, and the attributes which are specified in these specific retrieval requests are typically the sender-specified message attributes such as message ID or correlation ID. Merely setting a commit flag would not address the problem that messages may be identified by a search using an index value only to find that the message is not yet committed and available for retrieval.

Preferably, the assigned searchable index value for each message is held in a predefined area of storage to enable easy access to just the data in that predefined area (the index value, plus any additional indexes or identifiers) for comparison with retrieval request criteria. This provides further efficiency improvements over solutions which require retrieval of the whole message to compare with retrieval requests.

In a preferred method according to the invention, receiver application programs are able to issue retrieval requests with a wait attribute and the method includes: responsive to no messages which match the request being available in the queue when the request is issued, triggering a monitoring process to perform the monitoring step; and responsive to the monitoring step identifying the availability of a committed message in the queue having said assigned index key, determining whether the message matches a waiting retrieval request and, if matching, sending a response to the application program which issued the request. The response either includes a requested message or notifies a queue manager of the availability of the message to trigger a new request. Thus, a waiting retrieval request will be responded to when a matching message subsequently becomes available in the queue.

The invention is particularly applicable where the queue is a shared queue—comprising a message queue which is accessible to a plurality of resource manager programs. The invention's deferral of key assignment until commit time, and monitoring the availability of messages using the key, avoids resource managers retrieving messages while the put operation is in doubt while also avoiding the complexities of lock allocation and maintenance in a shared queue environment.

In a preferred embodiment, the queue is stored in a Coupling Facility list structure and the shared storage area is an area within a Coupling Facility list structure (which contains the queue) which holds control information for the list entries which represent the messages in each queue. The step of assigning the index key upon commitment entails a queue manager program which put a message to the shared queue providing the attribute value for building the index key when it commits the put operation. The Coupling Facility then stores the index key data within the Coupling Facility list entry control information of the list entry corresponding to the message. The monitoring process executes within the Coupling Facility in response to a retrieval request from a queue manager (which may be a "Get_wait"), and monitors the index key data within the Coupling Facility list entries.

The monitoring process preferably includes means for aggressive sub-list monitoring—in which message availability is notified for all messages on the queue for which the assigned index key indicates availability (i.e. Not stopping at the first available message) to trigger a comparison between all the available messages and the set of criteria of the retrieval request. By enabling batch processing, this can provide improved efficiency.

The assigned key preferably comprises a secondary index key representing sender-application-assigned attributes for identifying messages of special interest (such as a message ID or correlation ID). The secondary key can be used to identify the availability of messages for which a primary index key has already been assigned. The primary key may include an identification of the sender, a message priority and time stamp information for use in sequencing, and a flag specifying whether it is committed. The secondary key can then be used in response to a retrieval request for an initial identification of the availability of committed messages having an attribute which matches the request, and then the primary key may be used for sequencing these available messages or the primary key may only be used for retrieval requests which do not include application-specified attributes (e.g. If the request is a simple "Get_next" type).

The method of the invention may be implemented by a program product comprising program code including executable instructions which is recorded on a machine-readable recording medium, for controlling the performance of operations of a data processing apparatus on which it executes.

In a further aspect, the invention provides a data processing apparatus including: storage means; a data processor; a resource manager component for storing messages within a queue and storing index keys in association with the enqueued messages for use in retrieval of the messages from the queue, the resource manager component including: means for assigning an index key to a message in response to commit of the operation of putting the message on the queue, wherein the assigned index key comprises an attribute value of the message which was specified by the sending application when the message was sent; and means, responsive to a receiver application program requesting retrieval of messages from the queue and specifying the attribute value, for monitoring the availability of messages in the queue with reference to said assigned index key, whereby the index key assigned to the message in response to said commit provides an index which is usable for identifying committed messages having the particular application-specified attribute value.

BRIEF DESCRIPTION OF DRAWINGS

A preferred embodiment of the invention will now be described in more detail, by way of example only, with reference to the accompanying drawings in which.

DETAILED DESCRIPTION OF PREFERRED EMBODIMENT

The present invention may be implemented in a plurality of different data processing systems and network configurations, but is particularly applicable to a shared queue environment in which a plurality of queue manager programs running on different data processing systems have shared access to one or more queues in a shared resource. As is conventional, each system comprises one or more processors and an operating system and may constitute either a separate physical machine or a logical partition of a logically partitioned machine. The shared resource may be, for example, a Coupling Facility and the Coupling Facility's system may be a separate physical machine or a logical partition of a machine. It is preferred for the Coupling Facility to be provided on a separate data processing system to which each queue manager must connect, to minimise the likelihood of failure of the Coupling Facility itself. Although the invention is not so limited, the physical machines may be IBM S/390 Parallel Enterprise Server machines, and the operating system may be IBM Corporation's OS/390 operating system. (S/390, OS/390 and Parallel Enterprise Server are trademarks of International Business Machines Corporation).

U.S. patent applications Ser. Nos. 09/677,341 and 09/677,359, which are incorporated herein by reference, describe in detail the use of the list processing facilities of a coupling facility to implement a message queue that is shared by queue managers residing on different systems of a cluster of interconnected processing nodes (using the example of an IBM S/390 Parallel Sysplex configuration).

Figure 1:
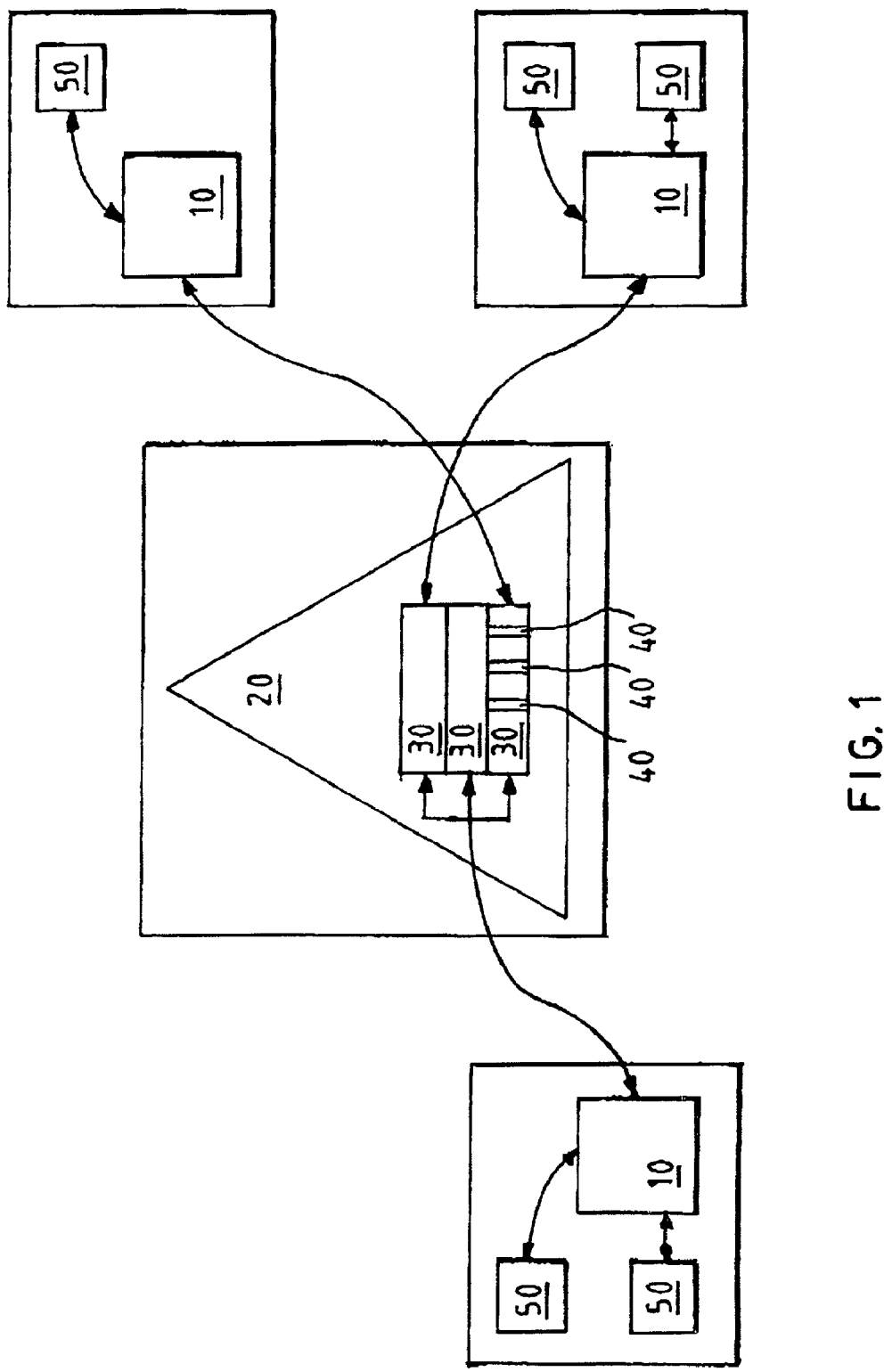
FIG. 1 is a schematic representation of a plurality of queue manager programs having shared access to a Coupling Facility.

FIG. 1 shows an example of three queue manager programs 10 directly connecting to a Coupling Facility 20, with each queue manager connecting to one or more list structures 30 in which are held a number of shared message queues. Each shared queue maps to a list header 40 within a list structure and each message that resides on a shared queue maps to a list entry on the shared queue list header. The ability for multiple queue managers to access the same shared queue in the Coupling Facility provides high availability of the messages on the shared queue—since the messages do not rely on the availability of a single queue manager.

As discussed above in relation to the prior art, an application 50 putting a message to a queue optionally assigns values to the message identifier and correlation identifier. These key values combined with the index type of the queue dictate which, if any, index entries are built at the Coupling Facility for use when retrieving the message.

In the shared queue environment, a way is needed of keeping a searchable index in an area of storage that is available to all shared queue managers. PutMessage operations need to create index entries and GetMessage operations need to access the index to allow queue access times to be decreased. However, if the indexes were all created as soon as the PutMessage operation is performed and before it is committed, then commit duration locks would be required to prevent messages identified using the index keys being retrieved before they are committed.

An application issuing a Get for a message with a specific message identifier or correlation identifier can optionally request to wait until a message which satisfies the criteria arrives on the queue. In a single queue manager environment, it is known for the queue manager to determine when a message is Put that satisfies a Get waiter. However, in the shared queue environment a message may be Put to the shared queue by an application program running on any queue manager which has access to the shared queue and similarly may be retrieved by an application running on any of these queue managers. A way is needed to notify the applications which issued a "Get_wait" request of the arrival on the queue of a message which has the message identifier or correlation identifier specified in the request. Ideally, the notification should only be sent when a message is Put to the queue that satisfies all criteria of the specific get wait request.

The invention uses an indexing scheme and Coupling Facility sub list monitoring facilities to notify queue managers when messages arrive on a queue. The indexing and Coupling Facility features which provide this support are described in U.S. patent application Ser. Nos. 09/677,339 and 09/677,341 which are incorporated herein by reference. The sequence of operations performed in accordance with an implementation of the invention will now be described with reference to FIGS. 2, 3 and 4.

Figure 2:
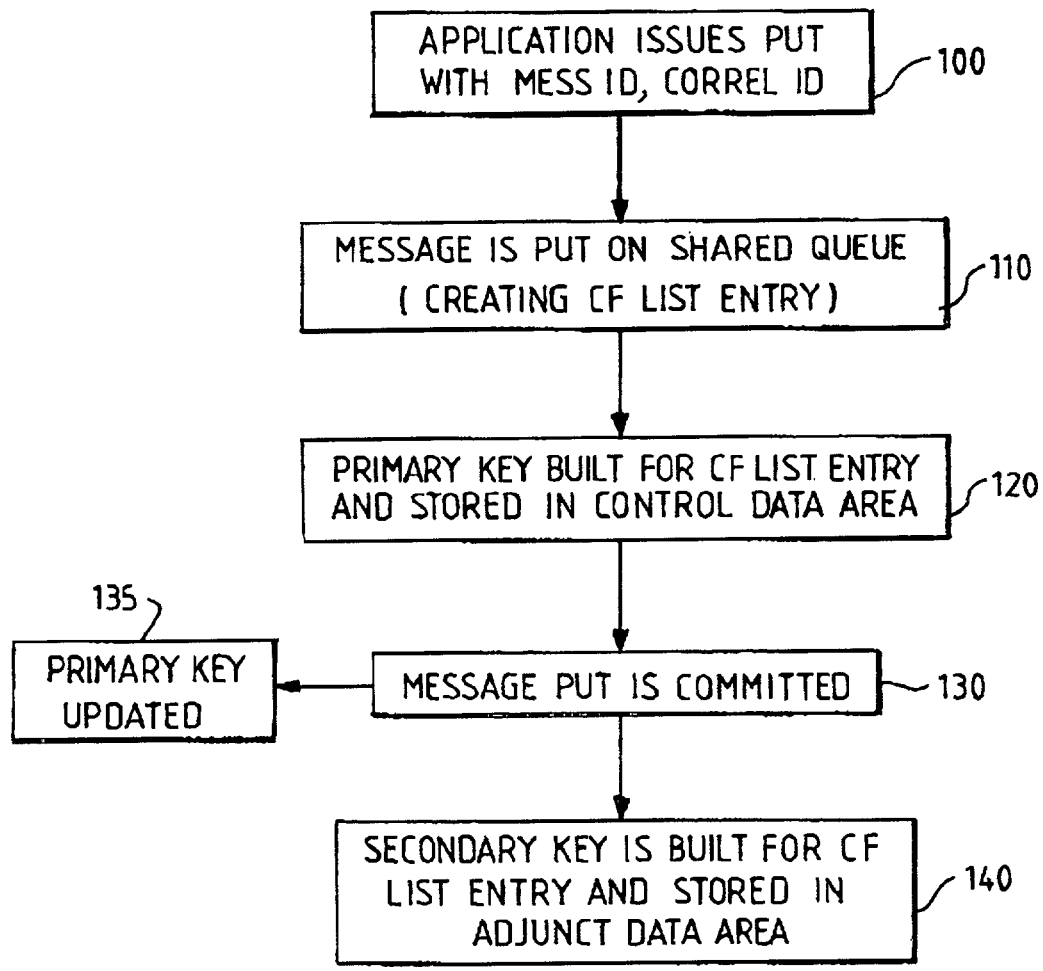
FIG. 2 shows a sequence of method steps for assigning index keys when a message is placed on a shared queue according to an embodiment of the invention.
Figure 3:
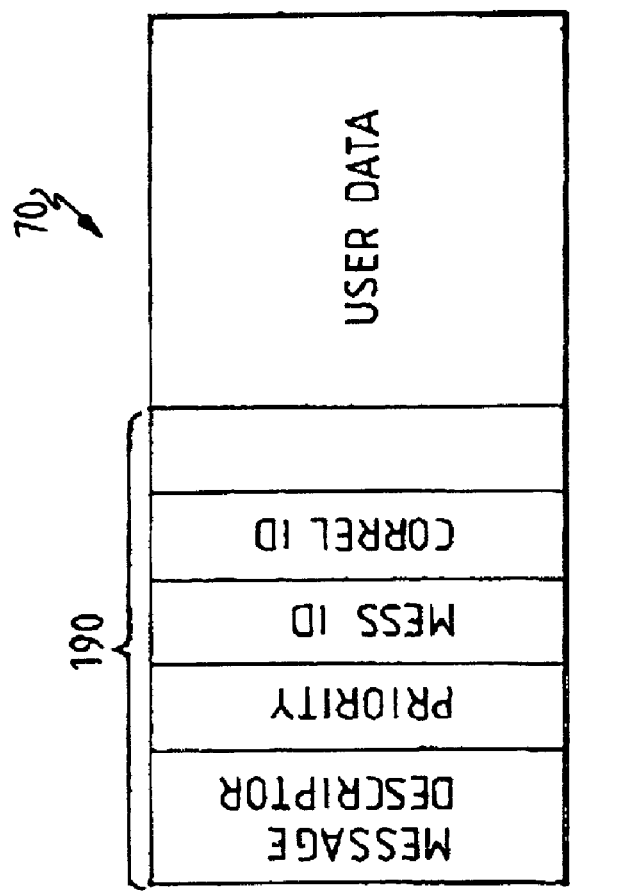
FIG. 3 is a representation of the structure of a message and of the data held in a control data area associated with the list entry which represents the message in a Coupling Facility list structure.
Figure 3:
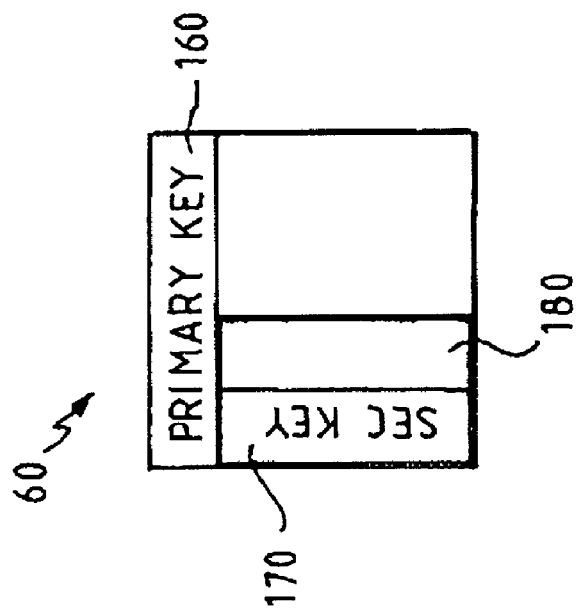

Referring to FIGS. 2 and 3, the solution implemented in the preferred embodiment of the present invention is to index shared queues using both a primary index key 160 and a secondary key 170 for each message. The primary key 160 is assigned 120 at message put time 110 (in response to an application issuing a Put command 100) and is modified 135 in response to commit 130 of the put operation. The secondary index key 170 is assigned when the message put operation is committed. The primary index key 160 includes a message priority value and a time stamp for sequencing, an identification of the queue manager which put the message on the queue, and an implicit commit flag. This implicit commit flag is implemented by converting the index key from an initial key range representing uncommitted messages to a key range representing committed messages.

The secondary index key 170 includes either the message ID or correlation ID (depending on whether messages are normally retrieved by reference to their message ID or correlation ID). These attributes are included in the message header 190 of a message 70 when it is sent 100 by the sender application (or its local queue manager on behalf of the application), and are retained by the sender application's queue manager until it commits 130 the put operation. When the message put is committed 130, the queue manager which commits the put operation notifies a controller component of the Coupling Facility of the commit and provides the message ID and/or the correlation ID to an index key generator component within the Coupling Facility. The secondary index key is now assigned 140 to the message—i.e. the key is built and stored in association with the queued message.

When built 140 at commit time, the secondary index key 170 is stored as a secondary list entry key maintained in the first 32 bytes of a 64 byte adjunct area 180 associated with a Coupling Facility list entry. This is shown in FIG. 3. The adjunct area 180 is a predefined area of storage for holding index information, and forms part of the list entry control information 60 which is stored by the Coupling Facility for each message. After commit 130 of the put operation, this control information 60 includes both the primary and secondary keys 160, 170 as well as additional sender-specified attributes (e.g. the message ID is also included in the adjunct area 180 if the secondary key 170 comprises the correlation ID). The data in the adjunct area can be retrieved after the monitoring of secondary keys identifies availability of a message having a first attribute which matches a retrieval request, and this data can be compared with additional criteria of the retrieval request to identify matching messages. The primary index information may then be used to differentiate between the ages and priority values of identified matching messages. This use of a collection of index information, including the additional application-specified data held in the adjunct area 180, ensures a more efficient comparison between available messages and retrieval requests than would be possible if the message headers themselves had to be analysed to identify matches.

In particular, the deferral of assignment of the secondary index key 170 until commit of the message put operation ensures that the queue can be searched using an index which automatically identifies only those messages which are committed and which match a sender-application specified attribute which is one of the criteria of the retrieval request.

Figure 4:
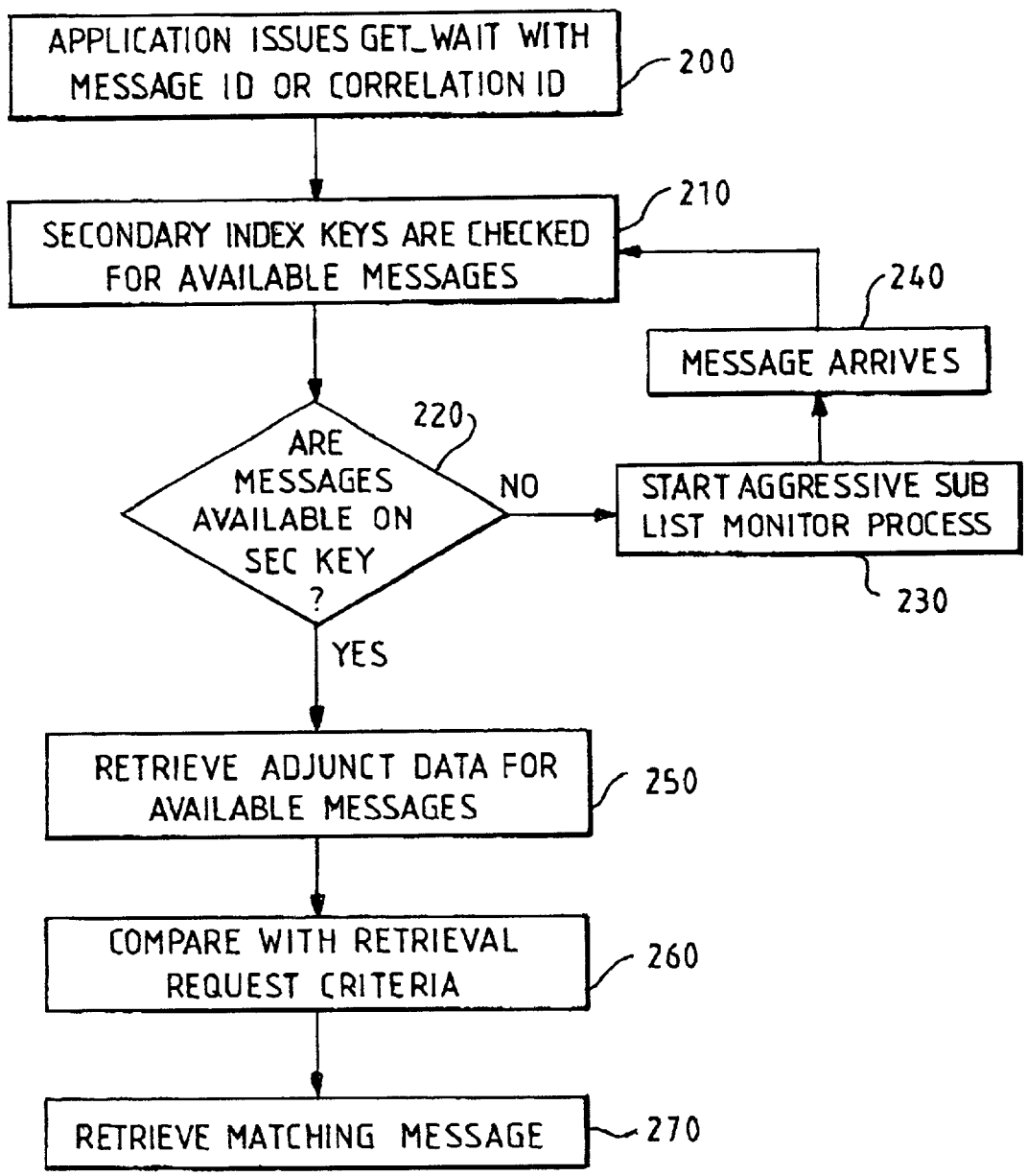
FIG. 4 shows a sequence of method steps for using message indexes when retrieving a message from a queue according to an embodiment of the invention.

A sequence of steps of an example message retrieval operation will now be described with reference to FIG. 4. When a retrieval request (GetMessage request) 200 specifies a wait option, this indicates a requirement for the requesting application to be notified when a message which satisfies the request becomes available on the queue, if no such message is currently available when the request is received and the secondary index keys within the adjunct area are scanned 210 for the first time. When a Get_wait request finds no currently available messages 220, a Coupling Facility sub list monitoring process is started 230 which responds to the arrival 240 of every new message on the queue by monitoring 210 the secondary list entry keys in the adjunct area of the respective Coupling Facility list entry control information to identify 220 messages which are available and have an index key matching the request. This is implemented as an aggressive sub list monitoring process, in the sense that all incoming messages 240 prompt a scan 210 of the secondary index keys in the adjunct area and hence, for identified matching messages, trigger retrieval 250 of the set of data in the adjunct area for comparison 260 with other criteria of the retrieval request. Since the adjunct data for messages having the appropriate secondary key can be read as a large batch, the comparison step can be handled efficiently for many messages after the search on the secondary key has provided an efficient first filter. When messages are identified in this way which satisfy the retrieval request, the message retrieval operation (message Get operation) is performed 270 under transactional control in the conventional way.

Additional features of the indexed queue support and coupling facility list monitoring according to the present invention will be described in more detail below.

Index Creation at COMMIT Time

This support is implemented on shared queues, using secondary key support on a Coupling Facility List Structure. At message COMMIT time, an index entry is created for a message (if required) by specifying a secondary key on the creation of the list entry that represents the committed message.

The creation of a secondary key is as follows:

1) At initial connect to a Coupling Facility list structure specify that secondary key support is required for all list entries within the list structure.

This is performed by invoking IXLCONN as follows:

```
?IXLCONN CFLEVEL (CSQE_CFLEVEL)
    ACCESSTIME (NOLIMIT) TYPE (LIST)
    ENTRYIDTYPE (USER)
    STRNAME (Csqecdsc_Structure_Name)
    STRDISP (KEEP)
    CONDISP (KEEP)
    NONVOLREQ (YES)
    EMCSTGPCT (CSQE_EMCSTGPCT)
    CONNAME (Csqecdsc_ConName)
    ELEMCHAR (CSQE_Element_Characteristic)
    MAXELEMNUM (CSQE_max_element_number)
    ENTRYRATIO (CSQE_Entry_Ratio)
    ELEMENTRATIO (CSQE_Element_Ratio)
    ADJUNCT (YES)
    LISTCNTLTYPE (ENTRY)
    REFOPTION (KEY)
    LISTHEADERS (Csqecdsc_Total_ListHeaders)
    LOCKENTRIES (CSQECDSC_Lock_Entries)
    NOTIFYEXIT (CSQENTFY)
    VECTORLEN (Csqecdsc_Vector_Length)
    ALLOWREBLD (NO)
    ALLOWAUTO (YES)
    ALLOWALTER (YES)
    RATIO (YES)
    SUSPEND (YES)
    MINENTRY (CSQE_MinEntry)
    MINELEMENT (CSQE_MinElement)
    MINEMC (CSQE_MinEmc_App1_Str)
    EVENTEXIT (CSQESES)
    COMPLETEEXIT (CSQECMPX)
    LISTTRANEXIT (CSQELTRS)
    CONDATA (Csqecdsc_Connection_Data)
    KEYTYPE (SECONDARY)
    RETCODE (Csqecdsc_Ixl_ret_code) !
    RSNCODE (Csqecdsc_Ixl_rsn_code)
    ANSAREA (Csqecdsc_Ixlconn_answer_area)
    ANSLEN (LENGTH (Csqecdsc_Ixlconn_answer_area))
```

2) Secondary Index entries created at message COMMIT time.
This is performed by invoking IXLLSTM as follows:

```
?IXLLSTM REQUEST (MOVE_ENTRYLIST)
    CONTOKEN (eTRQS_pSCB->Scb_STRB->STRB_Connect_Token)
    MODE (SYNCSUSPEND)
    BUFFER (Move_Indexed_EntryList_Buffer)
    BUFSIZE (lBufSize)
    ANSAREA (ixl_answer_area)
    ANSLEN (LENGTH (ixl_answer_area))
    FIRSTELEM (First_Move_Entry)
    LASTELEM (Last_Move_Entry)
    LISTTYPE (IDLIST)
    MOVETOKEY (TARGETKEY)
    MOVETOSKEY (TARGETKEY)
    VERSCOMPARE (BYENTRY)
    MISCOMPARE (HALT)
    LISTCOMPARE (YES)
    LISTNUM (list_number)
    RETCODE (ixl_ret_code)
    RSNCODE (ixl_rsn_code);
```

Index Usage at GET Time

This support is implemented on shared queues, using secondary key support on a Coupling Facility List Structure. The following methods are applicable depending on search criteria:

1) Queue Indexed by message identifier—search criteria is message identifier

OR
Queue Indexed by correlation identifier—search criteria is correlation identifier The following IXLLSTM invocation reads the List Entry Controls and Adjunct data for entries on the queue list header, in primary key sequence. Control information for each message that matches the indexed search criteria is returned as a result of this invocation. The control information associated with the first entry that matches our indexed identifier is the message that should be returned to the GET request.

```
?IXLLSTM REQUEST (READ_LIST)
    TYPE (ADJDATA, ECONTROLS)
    LOCATOR (UNKEYPOS)
    KEYSCANTYPE (ENTRY)
    KEYCOMPARE (YES)
    ENTRYKEY (key_of_Next_Message)
    KEYREQTYPE (RANGE)
    KEYRANGEEND (key_of_Last_Interesting_Message)
    SKEYCOMPARE (YES)
    SECONDARYKEY (start_SecondaryKey)
    SKEYREQTYPE (RANGE)
    SKEYRANGEEND (end_SecondaryKey)
    LISTNUM (Scb_Put_List_Number)
    CONTOKEN (Strb_Connect_Token)
    ADJAREA (Adjunct)
    BUFFER (parm_buffer)
    BUFSIZE (buffer_length)
    MODE (SYNCSUSPEND)
    RETCODE (Ixl_ret_code)
    RSNCODE (Ixl_rsn_code)
    ANSAREA (Ixllist_answer_area)
    ANSLEN (LENGTH (Ixllist_answer_area));
```

2) Queue Indexed by message identifier—search criteria is message identifier and correlation identifier.
OR
Queue Indexed by correlation identifier—search criteria is correlation identifier and message identifier.

The following IXLLSTM invocation reads the List Entry Controls and Adjunct data for entries on the queue list header, in primary key sequence. Control information for each message that matches the indexed search criteria is returned as a result of this invocation. This control information has to be examined to determine the first message that matches the non-indexed identifier. The first entry that matches on both the indexed and non indexed identifier is the message that should be returned to the GET request.

```
?IXLLSTM REQUEST (READ_LIST)
    TYPE (ADJDATA, ECONTROLS)
    LOCATOR (UNKEYPOS)
    KEYSCANTYPE (ENTRY)
    KEYCOMPARE (YES)
    ENTRYKEY (key_of_Next_Message)
    KEYREQTYPE (RANGE)
    KEYRANGEEND (key_of_Last_Interesting_Message)
    SKEYCOMPARE (YES)
    SECONDARYKEY (start_SecondaryKey)
    SKEYREQTYPE (RANGE)
    SKEYRANGEEND (end_SecondaryKey)
    LISTNUM (Scb_Put_List_Number)
    CONTOKEN (Strb_Connect_Token)
    ADJAREA (Adjunct)
    BUFFER (parm_buffer)
    BUFSIZE (buffer_length)
    MODE (SYNCSUSPEND)
    RETCODE (Ixl_ret_code)
    RSNCODE (Ixl_rsn_code)
    ANSAREA (Ixllist_answer_area)
    ANSLEN (LENGTH (Ixllist_answer_area));
```

Indexed Get Wait Support

This support is implemented on shared queues, using sub list monitoring within a Coupling Facility List Structure to monitor for arrival of messages on a Shared Queue. The following methods are applicable depending on search criteria:

1) Queues Indexed by Message Identifier

Applications that are waiting for a message to arrive on a queue with a specific message identifier or message identifier and correlation identifier will be automatically notified each time a message arrives on that queue that matches the message identifier (i.e. the indexed identifier for the queue).

This notification can be as the result of another queue manager putting a message to the shared queue.

2) Queues Indexed by Correlation Identifier

Applications that are waiting for a message to arrive on a queue with a specific correlation identifier or correlation identifier and message identifier will be automatically notified each time a message arrives on that queue that matches the correlation identifier (i.e. the indexed identifier for the queue).

This notification can be as the result of or another queue manager putting a message to the shared queue.

The notification mechanism which notifies a user of the arrival of every message that matches the indexed identifier is termed aggressive sub list monitoring. Aggressive sub list monitoring is utilized to provide support for a GET WAITER that is waiting only on the indexed identifier and for a GET WAITER that is waiting on the indexed identifier and the non indexed identifier. The GET WAITER will only actually retrieve a message if all identifier criteria are met.

The following IXLLSTC invocation sets sub list monitoring on a given indexed identifier.

```
?IXLLSTC REQUEST (MONITOR_SUBLIST)
    ListNum (Scb_Put_List_Number)
    Secondarykey (secondary_key)
    Action (Start)
    Notification (Every)
    ConToken (Strb_Connect_Token)
    AnsArea (Ixl_Answer_Area)
    AnsLen (Length (Ixl_Answer_Area))
    Retcode (Ixl_Ret_Code)
```

-continued
```
    RsnCode (Ixl_Rsn_Code)
    Mode (SyncSuspend);
```

If a requester application issues a GetMessage request without specifying attributes to be compared with index data for messages in the queue, then this is interpreted as a request to retrieve the next available message in the queue (in an order determined by sender-specified priority and message age). If a message put operation did not specify any attributes for use as a search index, then a retrieval request keyed by sender-specified attributes will not retrieve the message and the message will remain on the queue until retrieved by a non-specific "Get_next" request. However, it is a common requirement for requesting application programs to retrieve only a specific subset of the messages which may be on a queue. The solution described above in relation to a preferred embodiment of the present invention provides an efficient queue indexing solution for satisfying that requirement which avoids retrieval of uncommitted messages without the need to maintain locks and provides notifications to waiting requesters in a shared queue environment.

What is claimed is:

1. A method of managing retrieval of messages from a shared queue, where a plurality of receiver applications retrieve messages from the same shared queue, where a PUT operation by a sender application is used to place a message onto the shared queue, and where a message on the queue is not to be retrieved until a subsequent commit of the PUT operation occurs, the method comprising:

assigning an index key to a message in response to a commit of the PUT operation, wherein the assigned index key comprises an attribute value of the message which was specified by the sender application when the message was placed on the queue, so that the assignment of the index key is deferred until a commit occurs of the PUT operation; and in response to a receiver application requesting retrieval of messages from the queue and specifying a request attribute value, monitoring the availability of messages in the queue with reference to said assigned index key to identify a match, whereby the index key being assigned to the message in response to said commit is usable for identifying committed messages having an attribute value matching the request attribute value.

2. A method according to claim 1 wherein the receiver application specifies other criteria for a match, said method further including the step of:

in response to the monitoring step identifying the availability of a committed message in the queue which has the assigned index key, determining whether the message matches other criteria of the retrieval request; and in response to a positive match, sending a response to the receiver application which issued the request.

3. A method according to claim 2, wherein the monitoring step identifies to the requester application the the message corresponding to the match.

4. A method according to claim 1, wherein the attribute value included in the assigned index key is a message identifier or a correlation identifier.

5. A method according to claim 1, wherein receiver application programs are able to issue retrieval requests with a wait attribute, and wherein the method includes:

responsive to identifying no messages which match the requested attribute value, triggering a monitoring process to repeatedly perform the monitoring step for the request attribute value.

6. A method according to claim 1, wherein the queue is a shared queue held in a list structure of a Coupling Facility to which a plurality of resource managers can connect to put messages on the queue and to retrieve messages from the shared queue on behalf of respective sender and receiver applications.

7. A method according to claim 6, wherein the step of assigning an index key at commit time comprises a resource manager which put the message on the shared queue providing the attribute value to the Coupling Facility in response to committing the put operation, the Coupling Facility then building the index key and storing it in association with the enqueued message.

8. A method according to claim 6, wherein the assigned index value for each message is held in a predefined control data area of the Coupling Facility list structure which holds the shared queue.

9. A method according to claim 8, wherein the predefined control data area of the Coupling Facility list structure is a Coupling Facility list entry control data area, and the predefined control data area holds a message identifier and a correlation identifier for the message, the assigned index key comprising one of said message identifier or correlation identifier.

10. A method according to claim 6, wherein the monitoring step is performed by a monitoring process within the Coupling Facility in response to receipt of a retrieval request which specifies the request attribute value, the monitoring process including:
   means for determining whether an identified available message matches all criteria of the received retrieval request; and
   means, responsive to a positive match, for sending a response to the application program which issued the request.

11. A method according to claim 10, wherein the monitoring process is adapted to invoke said means for determining a match for all identified messages in said queue which have said assigned index value corresponding to the request attribute value.

12. A program product comprising program code including executable program instructions recorded on a machine-readable recording medium, for controlling the performance of operations of a data processing apparatus on which it executes relating to storage and retrieval of messages on a shared queue where a PUT operation is used to place a message on the queue but access is not intended until a subsequent commit action is taken, the program code including:
   program code for postponing the assigning an index key to a message to be in response to such commit of the PUT operation, wherein the assigned index key comprises an attribute value of the message which was specified when the message was sent; and
   program code, responsive to a receiver application program requesting retrieval of messages from the queue and specifying a request attribute value, for monitoring the availability of messages in the queue with reference to said assigned index key, whereby the index key assigned to the message in response to said commit provides an index which is usable for identifying only committed messages having the attribute value that matches the requested attribute value.

13. A resource manager component for a data processing apparatus, for storing messages within a queue and storing index keys in association with the enqueued messages for use in retrieval of the messages from the queue, the resource manager component including:
   means for assigning an index key to a message after a delay to be in response to commit of the operation of putting the message on the queue, wherein the assigned index key comprises an attribute value of the message which was specified by the sending application when the message was sent; and
   means, responsive to a receiver application program requesting retrieval of messages from the queue and specifying a request attribute value, for monitoring the availability of messages in the queue with reference to said assigned index key, whereby the index key assigned to the message in response to said commit provides an index which is usable for identifying only committed messages having the particular the request attribute value.

14. A data processing apparatus including:
   storage means;
   a data processor;
   a resource manager component for storing messages within a queue and storing index keys in association with the enqueued messages for use in retrieval of the messages from the queue, the resource manager component including:
   means for assigning an index key to a message after a delay to be in response to commit of the operation of putting the message on the queue, wherein the assigned index key comprises an attribute value of the message which was specified by the sending application when the message was sent; and
   means, responsive to a receiver application program requesting retrieval of messages from the queue and specifying a request attribute value, for monitoring the availability of messages in the queue with reference to said assigned index key, whereby the index key assigned to the message in response to said commit provides an index which is usable for identifying only committed messages having the request attribute value.

* * * * *